(No Model.)
F. W. STARR.
Vehicle Wheel Felly.
No. 235,176.        Patented Dec. 7, 1880.
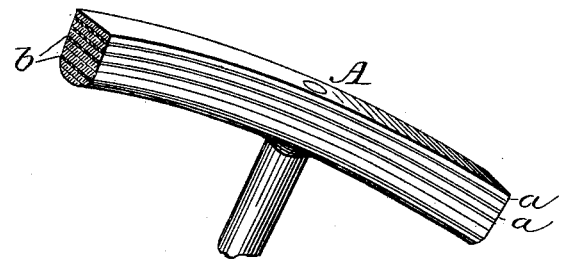
Witnesses:
A. McLoug.
Geo. M. Finckel.
Inventor:
F. W. Starr
By Atty
T. W. Robertson

UNITED STATES PATENT OFFICE.

FERDINAND W. STARR, OF GRAND LEDGE, MICHIGAN.

VEHICLE-WHEEL FELLY.

SPECIFICATION forming part of Letters Patent No. 235,176, dated December 7, 1880.

Application filed May 27, 1880. (No model.)

*To all whom it may concern:*

Be it known that I, FERDINAND W. STARR, of Grand Ledge, Eaton county, and State of Michigan, have invented an Improvement in Fellies for Wheels, of which the following is a specification.

This invention relates to that form of wheel-felly made of concentric layers; and it consists in making such wheels of layers saturated with waterproofing material, with strips of elastic material interposed between them and the whole glued together, whereby a felly is produced that is not only elastic, strong, and durable, but one upon which atmospheric changes will have but little effect.

In the accompanying drawing, which forms a part of this specification, A represents a section of a felly built up of thin layers of wood, *a a*, between which are interposed strips of rubber, *b*, or other suitable elastic material, the whole being securely glued together. These sections should be formed in straight strips and bent to the desired shape, and saturated with any desirable and suitable material which will exclude moisture.

A wheel made up of layers of wood saturated with water-proof material has the advantage of being substantially unaffected by atmospheric changes, and therefore not so likely to contract or expand in dry or wet weather, and will last much longer than a wheel not so saturated.

It will be found in practice that a felly or rim built up as described will compensate to a considerable extent the jar or concussion, will run with less noise, and will also almost entirely obviate the danger of "brooming" the spoke at the point where it comes in contact with the felly, or of laminating the latter.

What I claim as my invention is—

As a new article of manufacture, a wheel felly or rim made up of a series of thin layers of wood saturated with water-proof material, with strips of elastic substance interposed between them, and the whole glued together, substantially as described, and for the purpose set forth.

FERDINAND W. STARR.

Witnesses:
GEORGE A. BROWN,
GEORGE B. BROWN.